United States Patent [19]
Stone et al.

[11] Patent Number: 6,122,163
[45] Date of Patent: Sep. 19, 2000

[54] SECURITY MOUNTING STRUCTURE FOR ELECTRONIC APPARATUS COMPONENT

[75] Inventors: Lawrence A. Stone, Cypress; Jeffrey A. Lev, Houston, both of Tex.

[73] Assignee: Compaq Computer Corporation, Houston, Tex.

[21] Appl. No.: 09/122,933

[22] Filed: Jul. 27, 1998

[51] Int. Cl.$^7$ .................................................. G06F 1/16
[52] U.S. Cl. .............................. 361/685; 70/58; 361/686
[58] Field of Search ............................... 361/685; 70/58; 429/97, 98, 99; 292/163; 364/708.1

[56] References Cited

U.S. PATENT DOCUMENTS

| | | | |
|---|---|---|---|
| 5,107,400 | 4/1992 | Kobayashi | 361/685 |
| 5,251,105 | 10/1993 | Kobayashi et al. | 361/683 |
| 5,305,180 | 4/1994 | Mitchell et al. | 361/685 |
| 5,740,012 | 4/1998 | Choi | 361/685 |
| 5,757,616 | 5/1998 | May et al. | 70/58 |
| 5,987,937 | 11/1999 | Lee | 70/58 |

*Primary Examiner*—Leo P. Picard
*Assistant Examiner*—John Reed

[57] ABSTRACT

A hard disk drive is removably insertable into a portable computer base housing through a first opening therein to position the disk drive in a side-by-side relationship with a battery pack removable from within the housing through a second opening therein. In response to the insertion of the disk drive, a security latch mechanism within the housing releasably locks the disk drive therein. The latch mechanism has a movable release portion which is disposed within the housing, with manual access to the release portion being blocked by the battery pack which must be removed to permit the release portion to be operated to allow the disk drive to be removed from the housing. A latch member is positioned on a bottom exterior side portion of the housing and is operable to permit removal of the battery pack from the housing to provide access to the interior disk drive latch mechanism release portion. The disk drive is mounted within a frame-shaped carrier tray slidable into the housing interior between opposed guide rail members. To further deter unauthorized physical access to he inserted disk drive, a security screw is threaded through one of the guide rails into the carrier tray.

36 Claims, 5 Drawing Sheets

SECURITY MOUNTING STRUCTURE FOR ELECTRONIC APPARATUS COMPONENT

BACKGROUND OF THE INVENTION

1. Field of the Invention

The present invention generally relates to computer apparatus and, in a preferred embodiment thereof, more particularly relates to the mounting of data storage devices, such as hard disk drives, in computers.

2. Description of Related Art

Removably insertable hard disk drives are now common accessories used in conjunction with portable computers. Such hard disk drives are typically insertable into the base housing of the portable computer through an exterior opening therein. One conventional method of removing this type of hard drive is to open a door structure that normally extends over the insertion opening and pull on a tab connected to the inserted drive to remove it.

To make the inserted disk drive more secure against unauthorized physical access thereto and removal thereof from the base housing, it has been a conventional practice to use a security screw (i.e., one having a head configuration requiring a specially shaped tool to remove the screw) and an associated support bracket to hold the inserted disk drive in place within the portable computer base housing. A typical location of such security screw and associated bracket is on the bottom side of the base housing.

Several problems, limitations and disadvantages are associated with this conventional method of security mounting a hard disk drive in a computer housing. For example, most computer manufacturers have "drop test" standards which their computers must meet, and there are several manners in which a computer may fail such drop test. These include sustaining a certain amount of hard drive damage when dropped from a predetermined test height. Another way a computer of this general type may fail its drop test is if its removable hard disk drive is dislodged from its interior housing connection as a result of the drop impact. This can easily happen if the security screw is not installed, for example after the owner of the computer removes the original hard drive, installs a new one and neglects to replace the removed security screw structure.

Another potential problem associated with this security screw locking of a removable hard disk drive arises from the typical necessity of turning the system power off before removing the hard drive in order to assure that no data is lost due to the hard drive removal. The conventional use of the security screw attachment of the hard drive to the computer housing permits the hard drive to be removed without this sometimes critical shutoff of electrical power prior to removal of the hard drive.

From the foregoing it can be seen that a need exists for improved security mounting apparatus for a removable computer hard disk drive. It is to this need that the present invention is directed.

SUMMARY OF THE INVENTION

In carrying out principles of the present invention, in accordance with a preferred embodiment thereof, an electronic apparatus, representatively a computer system embodied in a portable notebook computer having a base housing, is provided. The base housing has first and second exterior openings therein. A first component is removably insertable into the housing through the first exterior opening, the first component preferably being a hard disk drive or other type of data storage device operative to store data retrievable by a microprocessor.

The electronic apparatus also includes a latch structure operative to releasably latch the first component within the housing, the latch structure having a movable release portion operative to unlatch the first component and permit its removal from the housing. A second component, which is representatively a battery pack device, is removably insertable into the second exterior housing opening in a manner causing the inserted second component to block access to the latch structure release portion.

The disk drive is preferably carried on a generally frame-shaped support tray member which is slidable into the interior of the housing between opposing guide rail members therein. The support tray member illustratively has front corner portions which are releasably locked to the latch member in response to insertion of the tray into the housing. By moving its release portion, the latch member is made to cam the latched tray member portions outwardly from the latch member to remove the tray member from locking engagement by the latch member.

According to an aspect of the invention, the tray member has an outer end panel portion which, with the tray member fully inserted into the housing, is brought into a flush relationship with the wall section of the housing through which the first exterior opening extends. This substantially prevents removal of the disk drive by grasping the tray end panel or prying it outwardly from the housing.

In accordance with another feature of the invention, a security fastener, representatively a security screw, is used to augment the unauthorized disk drive access deterrence provided by the disk drive latch structure. With the disk drive operatively inserted into the housing, the screw is threaded into aligned openings in one of the guide rails and a side portion of the support tray member. The presence of the security screw prevents the disk drive latch member from being used to release the tray, and thus the disk drive, from the housing. While the security screw provides an extra measure of hard drive physical access deterrence, the disk drive latch structure by itself firmly holds the support tray, and thus the hard disk drive, within the interior of the housing.

Thus, to remove the inserted hard disk drive, the battery pack device must first be removed from the housing. Preferably, the release portion of the latch structure is disposed within the interior of the housing and extends into a bay area therein which removably receives the battery pack device, and a latch structure is provided which is operative to releasably latch the battery pack within the bay area. The battery pack latch structure has a movable release portion disposed on the bottom side of the base housing.

In the preferred portable computer embodiment of the electronic apparatus, a locking structure is provided on the bottom side of the base housing and is engageable by a security latch structure disposed on a portion of a docking station upon which the base housing may be operatively placed when the portable computer is removably coupled to the docking station. This further deters unauthorized physical access to the hard disk drive by blocking access to the battery pack latch release portion on the underside of the docked computer base housing.

The security mounting apparatus incorporated in the electronic apparatus not only deters unauthorized physical access to the inserted hard disk drive, but also tends to prevent removal of the disk drive while electrical power is being supplied to the apparatus, since the battery pack must be removed before the disk drive can be removed. The location on the bottom side of the housing of the battery pack latch release portion also tends to assure that any AC power cable attached to the base housing will be removed therefrom before the disk drive is removed, since the base housing needs to be tipped upon a side edge thereof to reach the battery pack latch release portion and such tipping motion is hindered by an electrical cable externally connected to the base housing.

DETAILED DESCRIPTION

Figures 1, 2:
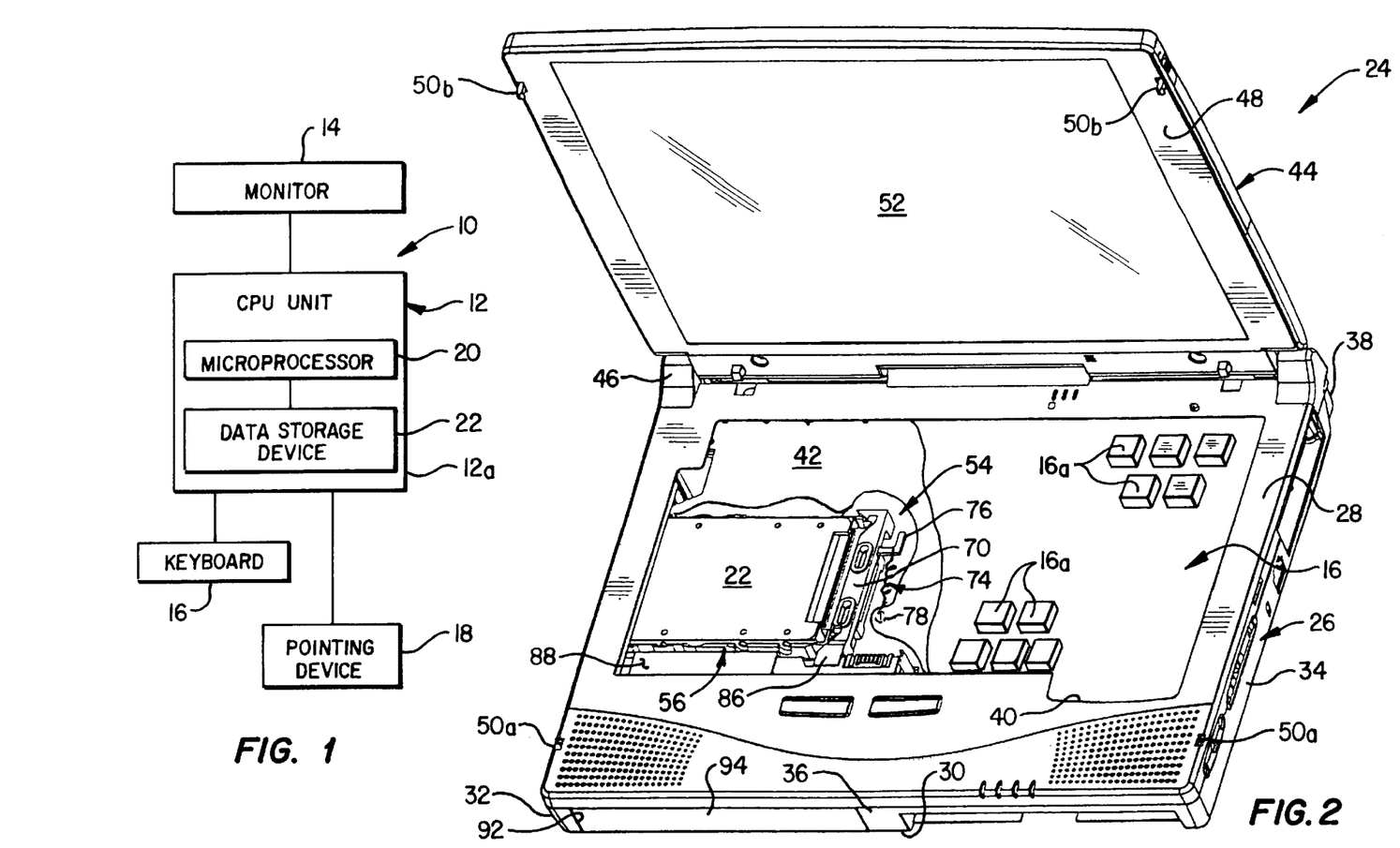
FIG. 1 is a schematic diagram of a representative computer system in which the present invention is incorporated.
FIG. 2 is a simplified, partially cut away perspective view of a portable notebook computer embodiment of the computer system.

Schematically depicted in FIG. 1 is a computer system 10 which includes a CPU unit 12 operatively connected to a monitor 14, a keyboard 16 and a pointing device 18 and having a microprocessor 20 and a data storage device, representatively a hard disk drive 22, operative to store data retrievable by the microprocessor 20. The microprocessor 20 and the data storage device 22 are disposed within a housing portion 12a of the CPU unit 12.

The computer system 10 is representatively embodied in a portable notebook computer 24, illustrated in FIG. 2, in which the microprocessor 20 (not shown in FIG. 2) and the hard disk drive 22 are disposed within a rectangular base housing 26 having top and bottom side walls 28 and 30, left and right end walls 32 and 34, and front and rear side walls 36 and 38. The base housing 26 and its internal components thus form the CPU unit 12 schematically depicted in FIG. 1.

The keyboard 16 has a series of manually depressible keys 16a and is positioned within an opening 40 formed in the top side wall 28 of the base housing 26 and overlies a sheet metal EMI shield wall 42 disposed within an upper interior side portion of the base housing 26. The hard disk drive 22 underlies the shield wall 42 and is positioned adjacent the left end wall 32 of the base housing 26. A conventional pointing stick (not shown in FIG. 2) is positioned between a centrally oriented group of the keys 16a and forms the pointing device 18 schematically shown in the FIG. 1 diagram.

Figure 3:
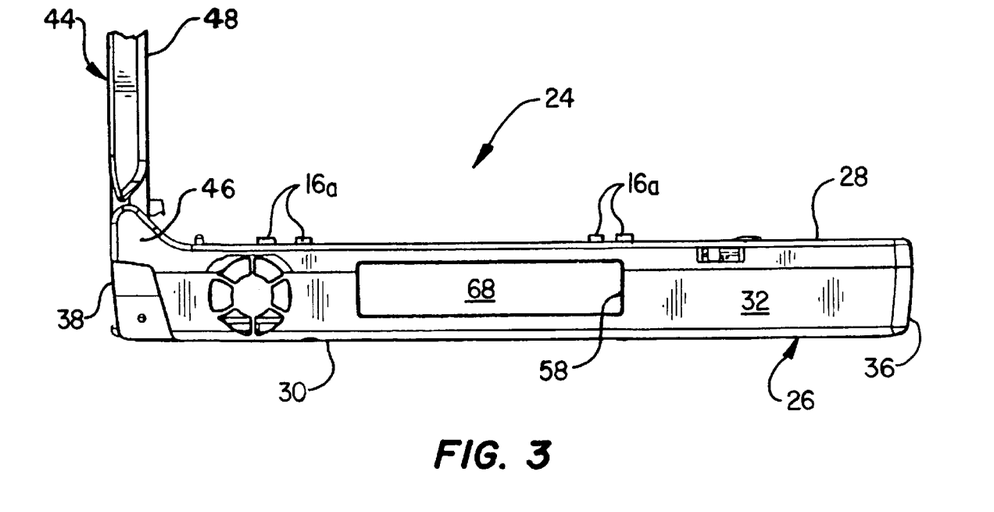
FIG. 3 is an enlarged scale partial side elevational view of the portable computer.

A relatively thin rectangular lid housing 44 is secured by a hinge mechanism 46 to a rear top side edge portion of the base housing 26 for pivotal movement relative thereto between an upwardly pivoted opened use orientation, shown in FIGS. 2 and 3, in which the front or inner side 48 of the lid housing 44 faces the user of the computer, and a downwardly pivoted closed position (see FIG. 7) in which the lid housing 44 extends across and covers the top side 28 of the base housing 26. Conventional cooperating latch structures 50a,50b respectively disposed on the base and lid housings 26 and 44 serve to releasably lock the lid housing 44 in its closed position. A display screen 52 is operatively carried on the front side 48 of the lid housing 44 which, with the display screen 52, forms the monitor portion 14 of the computer system 10 schematically depicted in FIG. 1.

According to a key aspect of the present invention, a specially designed security mounting system 54 (shown in FIGS. 2 and 4A–4C) is provided for releasably securing the hard disk drive 22 within the interior of the base housing 26. As will now be described, the mounting system 54 functions in a manner substantially deterring unauthorized physical access to and removal from the base housing of the installed disk drive 22.

The hard disk drive 22 is of a conventional construction, has a generally rectangular configuration, and is removably received in a generally frame-shaped support tray 56 which is slidable into and out of the interior of the base housing 26 through a rectangular opening 58 in its left end wall 32. A pair of guide rails 60,62 are positioned at opposite ends of the opening 58 and extend inwardly therefrom to guide opposite sides of the tray 56 as it slides inwardly through the opening 58. The right or inner end of the tray-supported disk drive 22 has an electrical connector 64 thereon which, with the disk drive 22 fully inserted into the base housing 26, releasably mates with a facing electrical connector 66 within the housing to operatively couple the inserted disk drive in a conventional manner with the computer circuitry within the base housing 26.

Figure 4A:
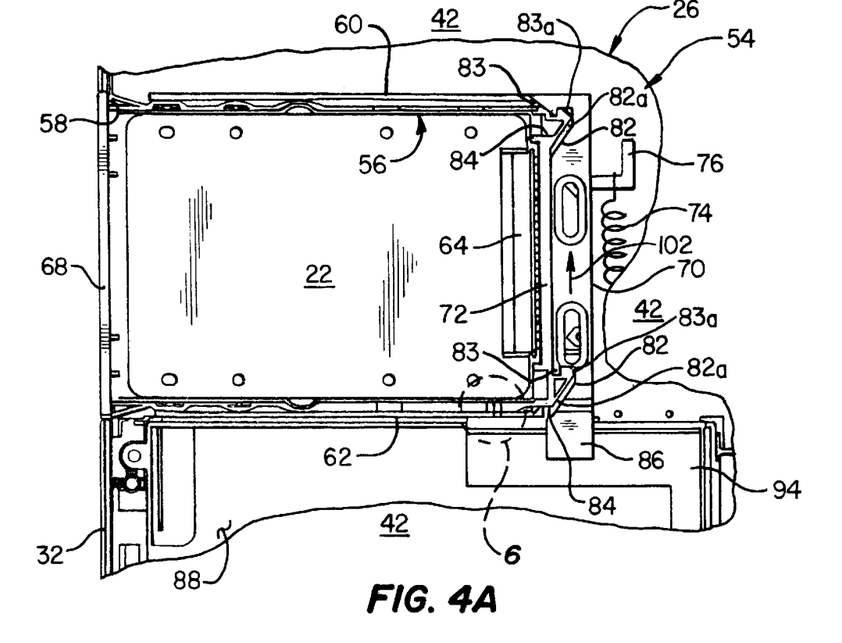
FIGS. 4A–4C are enlarged scale, partially cut away top plan views of a hard disk drive portion of the portable computer sequentially illustrating the operation of a specially designed security mounting system used in conjunction with the hard disk drive.
Figure 4B:
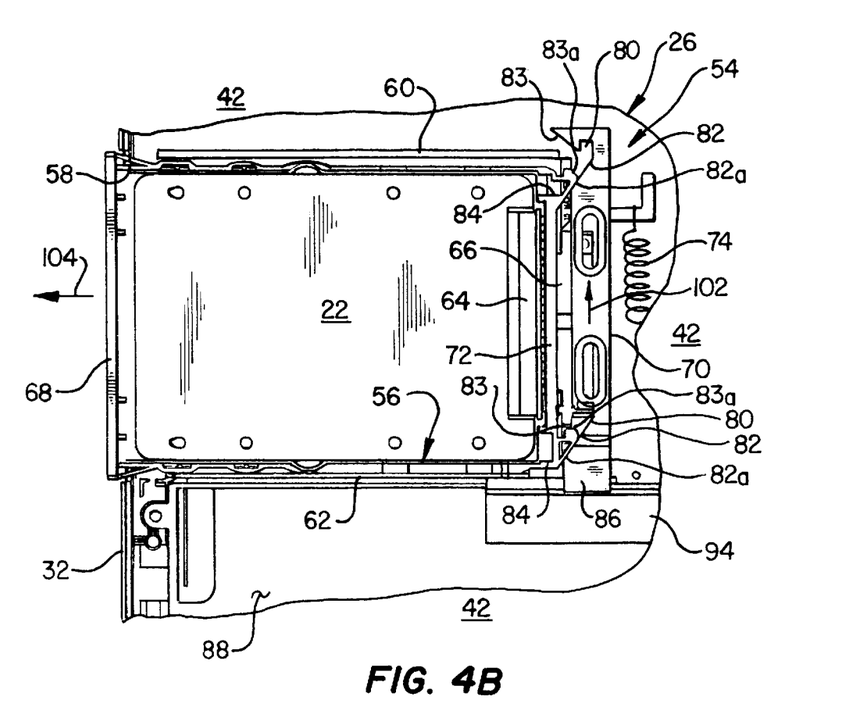
Figure 4C:
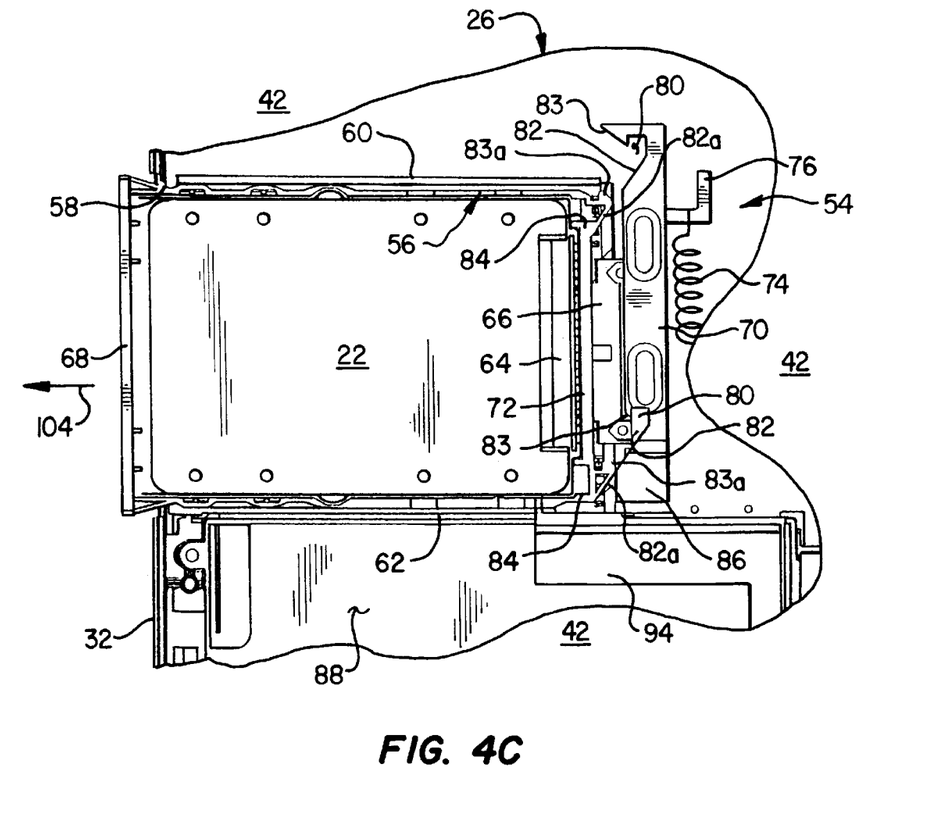

The outer end of the tray 56 has a flat rectangular panel portion 68 which, with the tray 56 fully inserted into the base housing interior, is received within the base housing end wall opening 58 in a flush relationship with the housing end wall 32 as may best be seen in FIG. 4A. This flush relationship between the tray panel portion 68 and the housing end wall 32 substantially hinders unauthorized removal of the tray-mounted disk drive 22 by grasping the panel 68 and pulling the tray out of the base housing, or prying the panel 68 outwardly from the base housing.

With continuing reference to FIGS. 2 and 4A–4C, the security mounting system 54 includes an elongated molded plastic latch bar member 70 that longitudinally extends parallel to the right or inner end wall 72 of the support tray 56 and is slidably supported on the underside of the EMI shield wall 42 for longitudinal movement relative thereto. A schematically depicted coiled tension spring member 74 is connected at one end thereof to a generally L-shaped connector portion 76 of the latch bar member 70, and at its other end to a suitably shaped underside portion 78 of the EMI shield wall 42 (see FIG. 2). Spring 74 resiliently biases the latch bar member 70 in a longitudinally downward direction as viewed in FIGS. 4A–4C.

The latch bar member 70 has a pair of generally hook-shaped edge indentations 80 that face the inner tray end wall 72 and have inclined cam surfaces 82 and 83 thereon. Front corner portions 84 of the support tray 56 are generally hook-shaped, and are releasably latchable in the indentations 80 of the latch bar member, and have inclined cam surfaces 82a and 83a thereon. Latch bar member 70 has, on its lower end as viewed in FIGS. 4A–4C, an end release tab portion 86 that projects into a generally rectangularly shaped battery pack bay 88 within the interior of the base housing 26.

Figure 5:
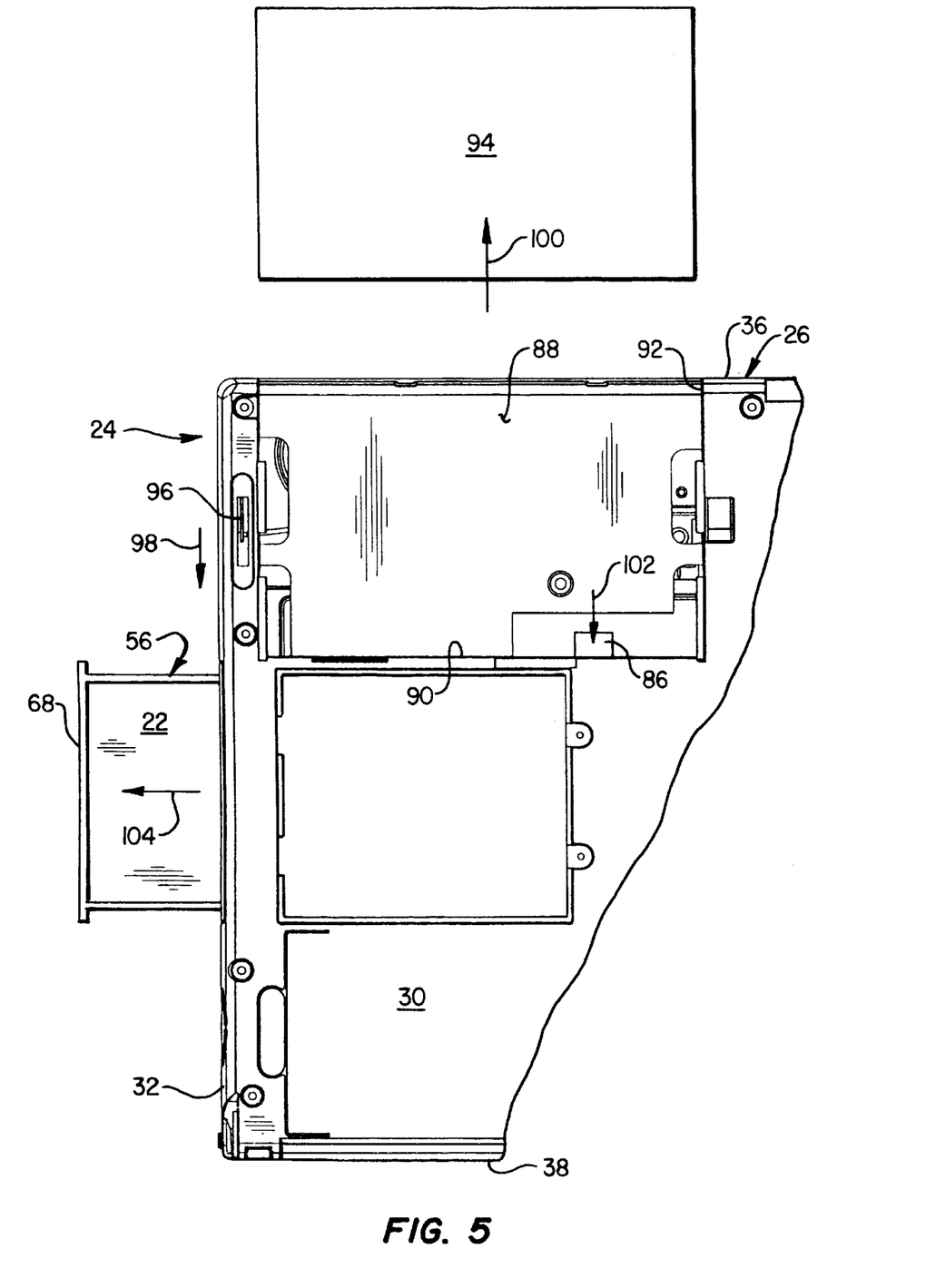
FIG. 5 is an enlarged scale partial bottom plan view of the portable computer illustrating the cooperation of a battery pack portion of the computer with the hard disk drive latching system.

As best illustrated in FIG. 5, the bay area 88 opens outwardly through the bottom side wall 30 of the base housing 26 via an opening 90 therein, and through the front side wall 36 of the base housing 26 through an opening 92 therein. Bay 88 removably receives a schematically depicted battery pack 94 which is insertable into the bay through the front side wall opening 92 of the base housing 26. As the battery pack 94 reaches its full insertion location in the bay 88, a conventional latch member 96 disposed on the bottom side 30 of the base housing 26 releasably locks the battery pack 94 within the bay 88. To subsequently remove the battery pack 94 from the bay 88, the latch member 96 is manually moved relative to the bottom side of the base housing 26 to unlatch the inserted battery pack 94.

As can best be seen in FIG. 4A, with the hard disk drive 22 operatively inserted into the interior of the base housing 26, and the support tray corner portions 84 releasably locked to the latch bar member 70, the installed battery pack 96 underlies and blocks manual access to the movable release portion 86 of the latch member 70 thereby precluding movement thereof to release the support tray 56, and thus its supported hard disk drive 22, from the base housing 26.

To remove the hard disk drive 22, it is first necessary to slide the battery pack latch member 96, as indicated by the arrow 98 in FIG. 5, to unlatch the battery pack 94, and then forwardly remove the battery pack 94 from its bay area 88 as indicated by the arrow 100 in FIG. 5. This exposes the disk drive latch release tab 86 within the now vacant battery pack bay 88. The tab 86 is then rearwardly pushed, as indicated by the arrow 102 in FIG. 5, to unlatch the carrier tray 56, as later described herein, and permit the tray and the disk drive 22 to be pulled outwardly through the left end wall opening 58 of the base housing 26 as indicated by the arrow 104 in FIG. 5.

Returning now to FIGS. 4A–4C, pushing the latch member end tab 86 in the direction of arrow 102 longitudinally translates the latch member 70 relative to the EMI shield wall 42 in the same direction to thereby cause the inclined latch member edge surfaces 82 to cammingly engage the corresponding tray corner portion surfaces 82a in a manner leftwardly driving the tray corner portions 84 out of locked engagement within the latch member edge indentations 80 and leftwardly driving the tray 56 outwardly through the base housing opening 58 as sequentially indicated by the arrows 104 in FIGS. 4B and 4C. After the tray 56 reaches its FIG. 4C position, in which it is completely disengaged from the latch member 70, the tray panel 68 can simply grasped and outwardly pulled to remove the supported hard disk drive 22 the rest of the way from the base housing.

While it is necessary to remove the battery pack 94 to gain access to the latch tab portion 86 and enable removal of the hard disk drive 22 from the base housing 26, the disk drive may be inserted into the base housing 26, and automatically latched therein, while the battery pack 94 is received in the base housing 26 or when the battery pack 94 is removed from the base housing 26. As the tray corner portions 84 initially engage the latch member 70 while the tray-supported hard disk drive 22 is being inserted into the base housing 26, the inclined tray corner surfaces 83a cammingly engage the facing inclined latch member surfaces 83 and deflect the latch member in the direction 102 (see FIG. 4A), against the resilient force of the spring 74, to allow the hooked tray corner portions 84 to lockingly snap into the complementarily configured latch member recesses 80 at which time the spring 74 returns the latch member 70 to its FIG. 4A position to releasably lock the tray corner portions 84 within the complementarily configured latch member indentations 80.

As described above, the security mounting system 54 utilizes the internally disposed latch member 70 to automatically lock the tray-supported hard disk drive 22 within the base housing 26 in response to its insertion therein, and further utilizes the inserted battery pack to block manual access to the release portion 86 of the tray latch structure. Additionally, the flush receipt of the tray end panel 68 within the base housing opening 58 further deters attempts to pull the drive out of the base housing, or pry it out, and gain unauthorized physical access to the installed hard disk drive.

Figure 6:
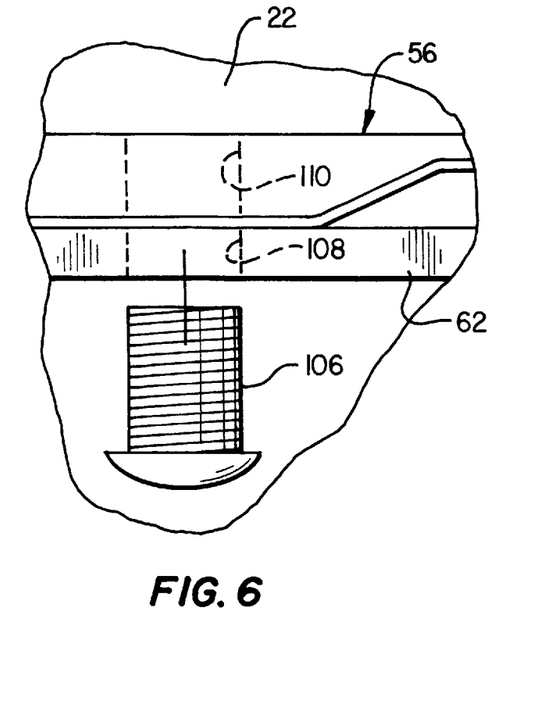
FIG. 6 is an enlarged scale top plan detail view of the dashed circle area "6" in FIG. 4A and illustrates the use of a security fastening member in conjunction with the mounted hard disk drive.

While the access-blocked hard drive latch structure serves this unauthorized access deterrence function quite well, it may be augmented, if desired, using a suitable security fastener such as the security screw 106 shown in FIG. 6. With the battery pack 94 removed, the screw 106 is threaded into aligned openings 108,110 respectively extending through the guide rail 62 (which is representatively formed integrally with the base housing or otherwise suitably anchored thereto) and an adjacent side wall portion of the tray 56. This additionally locks the tray 56, and thus the supported disk drive 22, within the base housing 26. The use of the security screw 106 also prevents the latch tab 86 from being used to eject the disk drive 22 by preventing the tab 86 from camming the tray corner portions 84 out of the corresponding latch member indentations 80. While the battery pack 94 is installed in the base housing 26 it blocks manual access to the security screw 106 in addition to blocking manual access to the latch tab 86.

Figure 7:
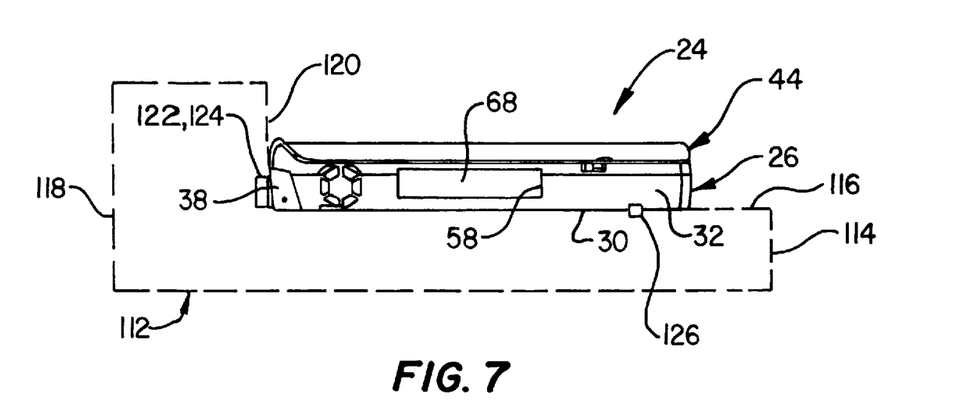
FIG. 7 is a simplified, partially phantomed side elevational view of the portable computer operatively connected to a representative computer docking station.

As described above, the key to gaining removal access to the installed hard disk drive 22 is gaining access to the latch tab 86 (and the security screw 106 if installed) by first removing the battery pack 94 to expose the interior of the battery pack bay area 88. By placing the battery pack latch 96 on the bottom side of the base housing 26 (see FIG. 5) an additional degree of disk drive access security is provided when the portable computer 24 is operatively coupled to a docking station 112 as schematically depicted in FIG. 7.

Docking station 112 is of a generally conventional construction and representatively has a horizontal portion 114 with a top side 116, and an upwardly projecting rear portion 118 having a front side 120. To dock the portable computer 24 it is placed, in its closed configuration, upon the top side 116 and moved rearwardly therealong until connectors 122, 124 respectively disposed on the rear end wall 38 of the base housing 26 and the front side portion 120 of the docking station are releasably mated. At this point a security latch structure 126 on the top side 116 of the docking station releasably locks to a bottom side portion of the base housing 26.

The security latch structure 126, and the underside portion of the base housing 26 to which the latch structure 126 releasably locks, are representatively similar to those illustrated and described in U.S. Pat. No. 5,694,292. As can be seen in FIG. 7, with the portable computer 24 docked in this manner, an added measure of security for the hard disk drive 22 is provided. Specifically, due to the coupled connectors 122,124 and the operation of the security latch structure 126, access to the battery pack latch 96 on the bottom side 30 of the base housing 26 is blocked, thereby preventing removal of the battery pack 94 to gain access to the disk drive latch tab 86 within the base housing.

In addition to securely latching the hard disk drive 22 within the base housing 26 without the use of the security screw 106, and facilitating the quick and easy insertion and removal of the hard disk drive, the security mounting system 54 of the present invention provides an additional benefit in that it tends to assure that the hard disk drive 22 will not be removed while system electrical power is being transmitted thereto, thereby creating a risk of losing important data. When battery power is being supplied to the system, this protective aspect arises from the fact that the battery pack 94 must be removed, thereby terminating battery power to the system, before the hard disk drive can be removed.

When AC power is being supplied to the system, via a power cable connected to a rear side portion of the base housing 26, the base housing is tipped over on its rear side 38 to access the battery pack latch 96. To conveniently do this, the AC power cord must be removed from the base housing, thereby terminating this power source to the system as well before the hard disk drive 22 is removed.

As representatively described above for a preferred embodiment of the present invention, unlatching access to an insertable hard disk drive component of a computer is blocked by a second insertable component illustratively in the form of a battery pack. It will be readily appreciated by those of skill in this particular art that the component to which unlatching access is blocked by a second insertable component may be another type of data storage device, or a component of another type altogether. Additionally, while the second, blocking component is representatively a battery pack, it will be readily appreciated that it could alternatively be a wholly different type of insertable component or structure if desired.

It will also be appreciated that while the security mounting system 54 has been illustrated and described herein as being utilized in a notebook computer, it could also be incorporated in other types of electronic apparatus including, but not limited to, desktop computers and other types of portable computers.

The foregoing detailed description is to be clearly understood as being given by way of illustration and example only, the spirit and scope of the present invention being limited solely by the appended claims.

What is claimed is:

1. Electronic apparatus comprising:
   a housing having first and second exterior openings therein;
   a first component removably insertable into said housing through said first exterior opening;
   a latch structure operative to releasably latch said first component within said housing, said latch structure having a movable release portion operative to unlatch said first component and permit its removal from said housing; and
   a second component removably insertable into said second exterior opening in a manner causing the inserted second component to block access to said release portion.

2. The electronic apparatus of claim 1 wherein said electronic apparatus is a computer.

3. The electronic apparatus of claim 1 wherein said electronic apparatus is a portable computer.

4. The electronic apparatus of claim 1 wherein said first component is a data storage device.

5. The electronic apparatus of claim 4 wherein said data storage device is a hard disk drive.

6. The electronic apparatus of claim 1 wherein said second component is a battery device.

7. The electronic apparatus of claim 1 wherein said release portion is disposed within the interior of said housing.

8. The electronic apparatus of claim 1 wherein said first and second components are electrical components.

9. The electronic apparatus of claim 1 wherein said latch structure includes:
   a resiliently biased latch member movably carried within said housing, and
   a latchable structure associated with said first component and being releasably engageable by said latch member in response to insertion of said first component into said housing through said first exterior opening.

10. A portable computer comprising:
    a base housing having first and second exterior openings therein;
    a data storage device removably insertable into said base housing through said first exterior opening;
    a latch structure operative to releasably latch said data storage device within said base housing, said latch structure having a movable release portion operative to unlatch said data storage device and permit its removal from said base housing; and
    a component removably insertable into said base housing through said second exterior opening in a manner causing the inserted component to block access to said release portion.

11. The portable computer of claim 10 wherein said portable computer is a notebook computer.

12. The portable computer of claim 10 wherein said data storage device is a hard disk drive.

13. The portable computer of claim 12 wherein said component is a battery pack.

14. The portable computer of claim 10 wherein said component is a battery pack.

15. The portable computer of claim 10 wherein said release portion is disposed within the interior of said base housing.

16. The portable computer of claim 10 wherein said latch structure includes:
    a resiliently biased latch member movably carried within said base housing, and
    a latchable structure associated with said data storage device and being releasably engageable by said latch member in response to insertion of said data storage device into said base housing through said first exterior opening.

17. The portable computer of claim 16 wherein said latchable structure is a support tray member supporting said data storage device for movement therewith into and out of said base housing through said first exterior opening.

18. The portable computer of claim 17 wherein:
    said first exterior opening extends through an exterior wall portion of said base housing, and
    said support tray member has an outer end portion defined by a panel structure configured to be in a flush relationship with said exterior wall portion when said tray member is fully inserted into said base housing.

19. The portable computer of claim 17 wherein:
    said base housing has a guide rail structure disposed therein and operative to guide said support tray member into the interior of said base housing,
    said support tray member and said data storage device are operatively inserted into said base housing, and
    said portable computer further comprises a security member removably threaded into said support tray member and a portion of said guide rail structure.

20. The portable computer of claim 15 wherein:

said component is insertable into a bay area within said base housing, and said movable release portion extends into said bay area.

21. The portable computer of claim 20 wherein:

said base housing has a bottom side, and said portable computer further comprises a component latch structure operative to releasably latch said component within said bay area, said component latch structure having a movable release portion disposed on said bottom side of said base housing and being operative to unlatch said component to permit its withdrawal from said bay area.

22. The portable computer of claim 21 further comprising a lockable structure disposed on said bottom side of said base housing and being lockingly engageable by a security latch structure disposed on a docking station portion upon which said portable computer may be operatively placed.

23. A computer system comprising:

a housing having first and second exterior openings therein;

a microprocessor disposed within said housing;

a data storage device operative to store data retrievable by said microprocessor, said data storage device being removably insertable into said housing through said first exterior opening;

a latch structure operative to releasably latch said data storage device within said housing, said latch structure having a movable release portion operative to unlatch said data storage device and permit its removal from said base housing; and a component removably insertable into said housing through said second exterior opening in a manner causing the inserted component to block access to said release portion.

24. The computer system of claim 23 wherein said housing is a portable computer housing.

25. The computer system of claim 24 wherein said portable computer housing is a notebook computer base housing.

26. The computer system of claim 23 wherein said data storage device is a hard disk drive.

27. The computer system of claim 26 wherein said component is a battery pack.

28. The computer system of claim 23 wherein said component is a battery pack.

29. The computer system of claim 23 wherein said release portion is disposed within the interior of said housing.

30. The computer system of claim 23 wherein said latch structure includes:

a resiliently biased latch member movably carried within said housing, and a latchable structure associated with said data storage device and being releasably engageable by said latch member in response to insertion of said data storage device into said housing through said first exterior opening.

31. The computer system of claim 30 wherein:

said latchable structure is a support tray member supporting said data storage device for movement therewith into and out of said housing through said first exterior opening.

32. The computer system of claim 31 wherein:

said first exterior opening extends through an exterior wall portion of said housing, and said support tray member has an outer end portion defined by a panel structure configured to be in a flush relationship with said exterior wall portion when said tray member is fully inserted into said housing.

33. The computer system of claim 31 wherein:

said housing has a guide rail structure disposed therein and operative to guide said support tray member into the interior of said housing, said support tray member and said data storage device are operatively inserted into said housing, and said computer system further comprises a security member removably threaded into said support tray member and a portion of said guide rail structure.

34. The computer system of claim 29 wherein:

said component is insertable into a bay area within said housing, and said movable release portion extends into said bay area.

35. The computer system of claim 34 wherein:

said housing has a bottom side, and said computer system further comprises a component latch structure operative to releasably latch said component within said bay area, said component latch structure having a movable release portion disposed on said bottom side of said housing and being operative to unlatch said component to permits withdrawal from said bay area.

36. The computer system of claim 35 wherein:

said housing is a portable computer base housing, and said computer system further comprises a lockable structure disposed on said bottom side of said base housing and being lockingly engageable by a security latch structure disposed on a docking station portion upon which said base housing may be operatively placed.

* * * * *